May 3, 1960 L. R. WOODS 2,935,549
TUBE SHIELD LINER
Filed Sept. 17, 1956
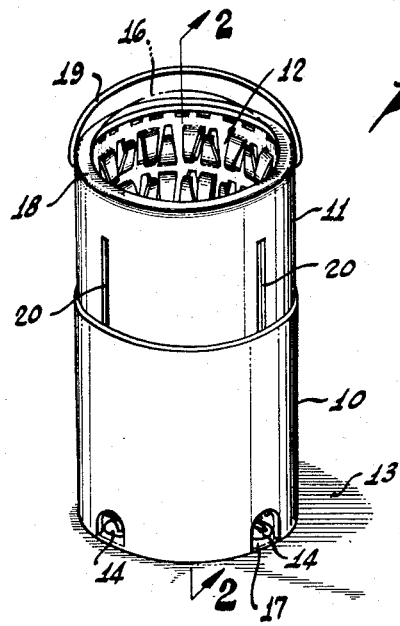
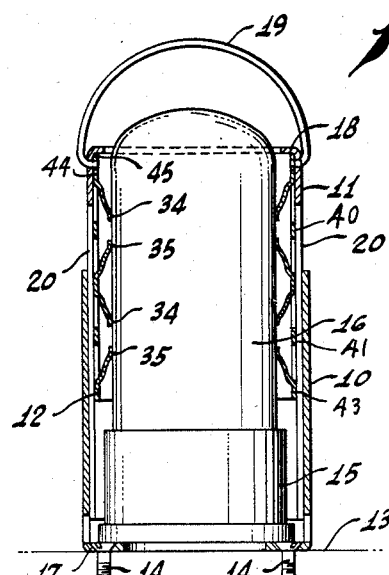
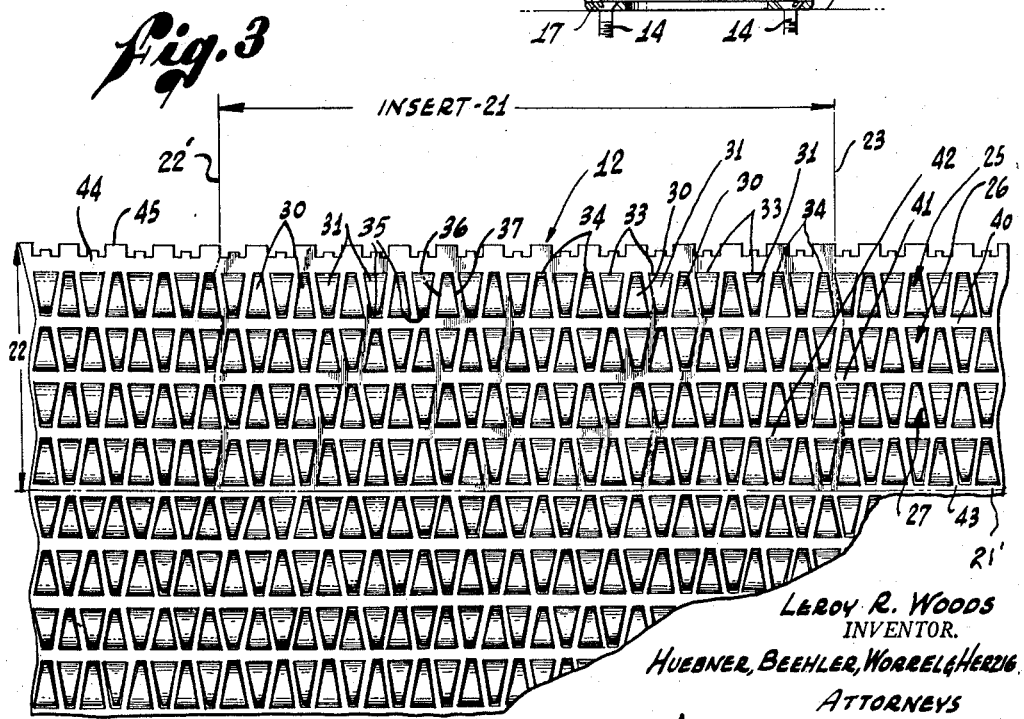
LEROY R. WOODS
INVENTOR.
HUEBNER, BEEHLER, WORREL & HERZIG
ATTORNEYS …

United States Patent Office 2,935,549
Patented May 3, 1960

2,935,549

TUBE SHIELD LINER

Leroy R. Woods, Whittier, Calif., assignor to International Electronic Research Corporation, Burbank, Calif., a corporation of California Application September 17, 1956, Serial No. 610,187

5 Claims. (Cl. 174—35)

The invention relates to shields for electronic components and has particular reference to a tube shield liner and an appropriate shield which is particularly well adapted to dissipating heat generated in the tube and simultaneously minimizing the effect of vibrations of high frequency which might be present in the chassis and be otherwise transferred to the electronic component through the shield.

Within the past few years attention has been directed for the first time to improving tube shield assemblies with special emphasis upon an improved transfer of heat generated during operation of the tube thereby to extend the life of electronic components in the form of tubes with glass envelopes. More stringent requirements brought about by a greatly accelerated employment of electronic equipment in jet aircraft and missiles have furthermore made obsolete to a large degree tube shields previously employed because of their inability to prevent vibrations and especially high frequency vibrations from passing to the rather delicate interiors of electronic tubes, thereby causing early breakdown of these parts. Failure of electronic tubes in critical equipment is such that the likelihood cannot be tolerated where it is at all possible to guard against it and the expedients resorted to in order to assure continued performance have often resulted in wholesale replacement of good tubes where they may have been in use for a period of time.

Although some expedients have already been worked out in the interest of supplying some of the needs herein referred to, some of these innovations have been to a degree complicated, thereby impairing widespread use because of price. On one or two other occasions where inexpensive design has been attempted, efficiency has been cut down to a degree where such inexpensive variations have only a very limited application.

It is therefore among the objects of the invention to provide a new and improved liner for an electronic component shield which is extremely simple, inexpensive to manufacture and install and which at the same time is particularly efficient and effective both with respect to the transfer of heat and with respect to minimizing the effect of high frequency vibrations on the electronic component.

Another object of the invention is to provide a new and improved tube shield assembly which is so designed that it can be constructed of raw materials in inexpensive form and one capable in combination of virtually maximum effectiveness by use of relatively a minimum number of individual parts.

Still another object of the invention is to provide a new and improved liner for tube shields which can be stamped from a single piece of sheet material and which has such form that it can be readily rolled into cylindrical shape for easy insertion in the sleeve portion of a tube shield.

Still further among the objects of the invention is to provide a new and improved tube shield liner material of such form, construction and configuration that large sheets can be formed with a single operation in such fashion that they can subsequently be recut to various sizes, thereby to accommodate tube shields of various sizes without the necessity of maintaining a separate inventory for each and every separate size.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

Figure 1 is a perspective view of the tube shield assembly incorporating the liner herein made reference to.

Figure 2 is a longitudinal sectional view on the line 2—2 of Figure 1 showing the tube shield combination in place around an electronic tube.

Figure 3 is a plan view of a piece of sheet material formed in a large piece with configurations arranged in such manner that the large piece can be cut to a proper size to fit some selected tube shield combination.

This is a continuation-in-part of my co-pending application Serial No. 345,597, filed March 30, 1953, now Patent No. 2,807,659.

In an embodiment of the invention chosen for the purpose of illustration there is shown a tube shield combination consisting of a base 10, a sleeve 11, and a liner indicated generally by the reference character 12. For purposes of illustration the base is shown mounted on a chassis 13 by means of screws 14. A socket 15 receptive of a tube constituting a glass envelope or bulb 16 is shown mounted within the base.

More particularly the base consists of a tubular element having an inwardly bent flange 17 at the bottom through which the screws 14 may pass.

The sleeve 11 is likewise tubular and has an annular flange 18 at the top inwardly bent and relatively narrow in width. For convenience in handling the sleeve a bale 19 is provided which engages the liner immediately beneath the flange 18. In order that the sleeve may have a snug sliding fit within the base, the outside diameter of the sleeve is approximately equal to the inside diameter of the base 10 but slots 20 are cut inwardly from the bottom end of the sleeve throughout most of the height and thereby incorporate into the sleeve a springy effect which permits the sleeve to slide into the base and be maintained therein.

The liner 12 may be constructed in a large piece such as that illustrated in Figure 3 or, should conditions warrant, may be constructed initially with only a length 21 and width 22 such as a single liner would have. As shown the liner may be of virtually any length and even in rolled stock if need be. While more conveniently the liner will have a predetermined width 22 suitable to tube shields of a given length, occasions may arise where the piece of liner material may have a greater width and be subject to being slit longitudinally along a line 21', thereby to give it a desired width to fit a predetermined length of tube shield sleeve. The inside circumference of the sleeve will determine the length 21 and the location of lines 22' and 23. This cutting along the lines 22' and 23 need be only through the metal portion separating rows 25, 26, 27, etc., of fingers 30, 31.

The liner 12 as previously indicated is a single sheet of spring-like material preferably metal chosen for its effective heat-conducting characteristic. The fingers 30 and 31 are identical but are reversed in position alternately along each respective row; that is to say, bases 32 of fingers 30 are on the same side of the row 25 whereas bases 33 of fingers 31 are on the opposite side. By the same token apexes 34 of fingers 30 are on the opposite side of the row from apexes 35 of fingers 31. The apexes and diagonal sides 36 and 37 in each instance are cut clear.

The cut-out fingers 30 and 31 are pressed away from the plane of the liner to the positions illustrated best in Figure 2. As there shown the apexes 34 and 35 have a somewhat flat tip or end curved slightly so as to engage over some area of the envelope 16 at each point of contact.

It will be noted further that the rows 25 and 26 are separated by an imperforate strip 40. Other imperforate strips 41 and 42 separate the other rows. A plain band 43 appears on the lower side as viewed in Figure 3, whereas a band 44 on the upper side is provided with a specially shaped edge 45.

Assuming that the sleeve 11 takes a liner or insert having a length 21 and breadth 22, a liner cut to that length is rolled into a cylindrical shape with the rows 25, 26, 27, etc., taking an annular shape and with the fingers pointed inwardly. The rolling is made smaller than the inside circumference of the liner with edges overlapping and the liner inserted into the sleeve from the bottom of the sleeve, as viewed in Figure 2. The liner is pushed into the sleeve until the edge 45 strikes the flange 18, at which time the overlapped edges of the liner are released. The length of the liner is cut to such dimension that when released the edges will approximately abut each other. No other fastening means need be provided inasmuch as the spring-like expansion of the liner itself coupled with the frictional engagement between the edges of the liner and the inside wall of the sleeve will be sufficient to hold the liner in proper position.

With the liner inserted in the sleeve, the sleeve is then pressed down over the glass envelope 16 within the base and the tendency of that application will be sufficient to press the liner frictionally upwardly to its uppermost position and to bind the sleeve within the base.

There has accordingly been herein shown and described a tube shield liner of very simple construction, namely, consisting of a single sheet of material stamped, however, in such form that a multiplicity of spring fingers extend outwardly from the plane surface of the sheet. The fingers are regularly and uniformly spaced and alternately positioned so as to maintain a maximum of structural rigidity and at the same time afford a maximum amount of springy consistency to the apexes where they are uniformly in engagement with the glass envelope throughout its exterior. It will be noted further that although there are openings in a direction laterally or edgewise of the diagonal sides of the individual fingers, nevertheless there is a substantially imperforate presentation of the liner as a whole to the glass envelope. Hence, although there is ample space for ventilation of heat around the tube shield, nevertheless there is a maximum amount of electrical shielding effect for the tube. The multiplicity of area contacts at the apexes provides for effective removal of heat by conduction and by the same structure passage of vibrations of high frequency from the chassis through the base to the tube envelope is minimized. The composite structure made as shown and described of simple parts and simply constructed is effective in the production of an effective combination with a minimum of operations and amount of material.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire ot secure by Letters Patent is:

1. A vibration dampening and heat conducting liner for an electronic component shield of hollow cylindrical form comprising a rectangular piece of sheet metal having a width substantially equal to the length of the shield and a length substantially equal to the inside circumference of the shield, and a pattern of substantially uniformly spaced rows of tapered spring fingers stamped from said sheet metal and spaced equidistant one finger from another along each row, and an imperforate straight flat band separating each row, each finger having a trapezoidal form with the base attached to the sheet and a portion thereof adjacent the apex extending outwardly in a position substantially parallel to said flat bands and having an area curved to form said portion into a flat component contacting area, said fingers in each row extending alternately in opposite directions and on the same face of said piece of sheet metal whereby to space said contacting areas at alternately opposite locations and adjacent fingers of adjacent rows facing in opposite directions whereby to balance the contacting areas about the liner.

2. A vibration dampening and heat conducting lining material for electronic tube shields comprising a piece of sheet metal of length and breadth exceeding the length and inside diameter of a tube shield, a plurality of equally spaced parallel rows of spring fingers extending in one direction of said piece, each spring finger having a relatively wide base attached to the piece of sheet metal and a relatively narrow apex raised a distance equal to a fraction of its length from the surface of said piece of sheet metal and substantially covering a hole from which the finger is stamped, each said apex having an area substantially conforming to an adjacent area of said tube, said bases of adjacent fingers of each row being located alternately on opposite sides of the row and on the same face of said piece of sheet metal, said piece having portions thereof parallel to and between the rows adapted to be cut in one direction and having portions thereof transverse to the rows between fingers adapted to be cut whereby to enable a plurality of liners for individual tube shields to be cut from a single piece of preformed sheet metal.

3. A vibration dampening and heat conducting tube shield assembly for the glass envelope of an electronic tube comprising an imperforate hollow base, a hollow sleeve having an outside diameter substantially equal to the inside diameter of the base whereby to provide a spring fit for said sleeve in said base, a liner for said sleeve comprising a single piece of sheet metal having a width substantially equal to the length of the sleeve and a length substantially equal to the inside perimeter of the sleeve whereby end edges of said liner abut when in place, and a series of spaced parallel perimetral rows of spring fingers stamped from said sheet metal, each finger having a relatively wide base attached to the piece of sheet metal and a relatively narrow apex removed from the plane of said piece of sheet metal, said fingers having positions substantially covering the holes from which they are cut and providing laterally open spaces for circulation of air between the exterior surface of the liner and the envelope, the fingers in each row having bases on alternately opposite sides of the row, each finger having an area at the apex bent to a position substantially parallel to said sleeve and being curved to conform to the shape of the envelope whereby to provide a uniform pattern of spring fingers encompassing and covering said envelope and pressing uniformly inwardly against the envelope and outwardly against the sleeve.

4. A vibration dampening and heat conducting tube shield assembly for the glass envelope of an electronic tube comprising an imperforate hollow cylindrical base, a hollow cylindrical sleeve having an outside diameter substantially equal to the inside diameter of the base and having deep slits extending inwardly from an open end whereby to provide a spring fit for said sleeve in said base, and a bale at the opposite end of said sleeve, a liner for said sleeve comprising a single piece of sheet metal having a width substantially equal to the combined length of the slit and unslit portions of the sleeve and a length substantially equal to the inside circumference of the sleeve whereby end edges of said liner abut when in place, and a series of equally spaced parallel annular rows of spring fingers stamped from said piece of sheet metal and located on the same face of said piece of sheet metal, each finger having a relatively wide base joined to the piece of sheet metal and a relatively narrow apex, the fingers in each row having bases on alternately opposite sides of the row and the bases of fingers of adjacent rows being opposite each other, each finger having an area at the apex bent to a position substantially parallel to the face of the envelope and being curved to conform to the face of the envelope whereby to provide a uniform pattern of spring fingers pressing simultaneously inwardly against the envelope and outwardly toward the liner and occupying an area encompassing and covering said envelope.

5. A device for use with an electronic component having an exterior surface of predetermined form comprising a vibration dampening and heat conducting liner for an electronic component shield of hollow elongated form said liner comprising a sheet of heat conducting and electric shielding material having a width exceeding the length of the shield and a length exceeding the inside perimeter of the shield, a pattern of substantially uniformly spaced rows of tapered spring fingers stamped throughout a portion of their perimeters from the sheet and spaced one finger from another along each row, each finger having a base attached to the sheet and the apex free of the sheet extending outwardly of the plane of the sheet on the same side thereof, each said finger having an outermost portion free of the sheet and bent to a position and form shaped in conformance with the form of an adjacent portion of said component, each said finger presenting a component contacting area initially parallel to the sheet, said sheet being substantially imperforate except for spaces opening laterally between the plane of said sheet and the portions of the sheet forming said fingers whereby to form a continuous electrically shielding sheet, said sheet being adapted to be cut between rows of said fingers in one direction and between fingers in a transverse direction whereby to enable a plurality of liners for individual tube shields to be cut from a single piece.

References Cited in the file of this patent

UNITED STATES PATENTS

| | | |
|---|---|---|
| 514,313 | Eckstein | Feb. 6, 1894 |
| 936,183 | Stein | Oct. 5, 1909 |
| 1,548,809 | Jones | Aug. 4, 1925 |
| 1,839,284 | White | Jan. 5, 1932 |
| 2,745,895 | Lideen | May 15, 1956 |